June 15, 1926.
E. L. HOGAN ET AL
1,588,833
APPARATUS FOR RECOVERING HEAT FROM VAPOR, GASES, AND THE LIKE
Filed Nov. 3, 1922   3 Sheets-Sheet 1
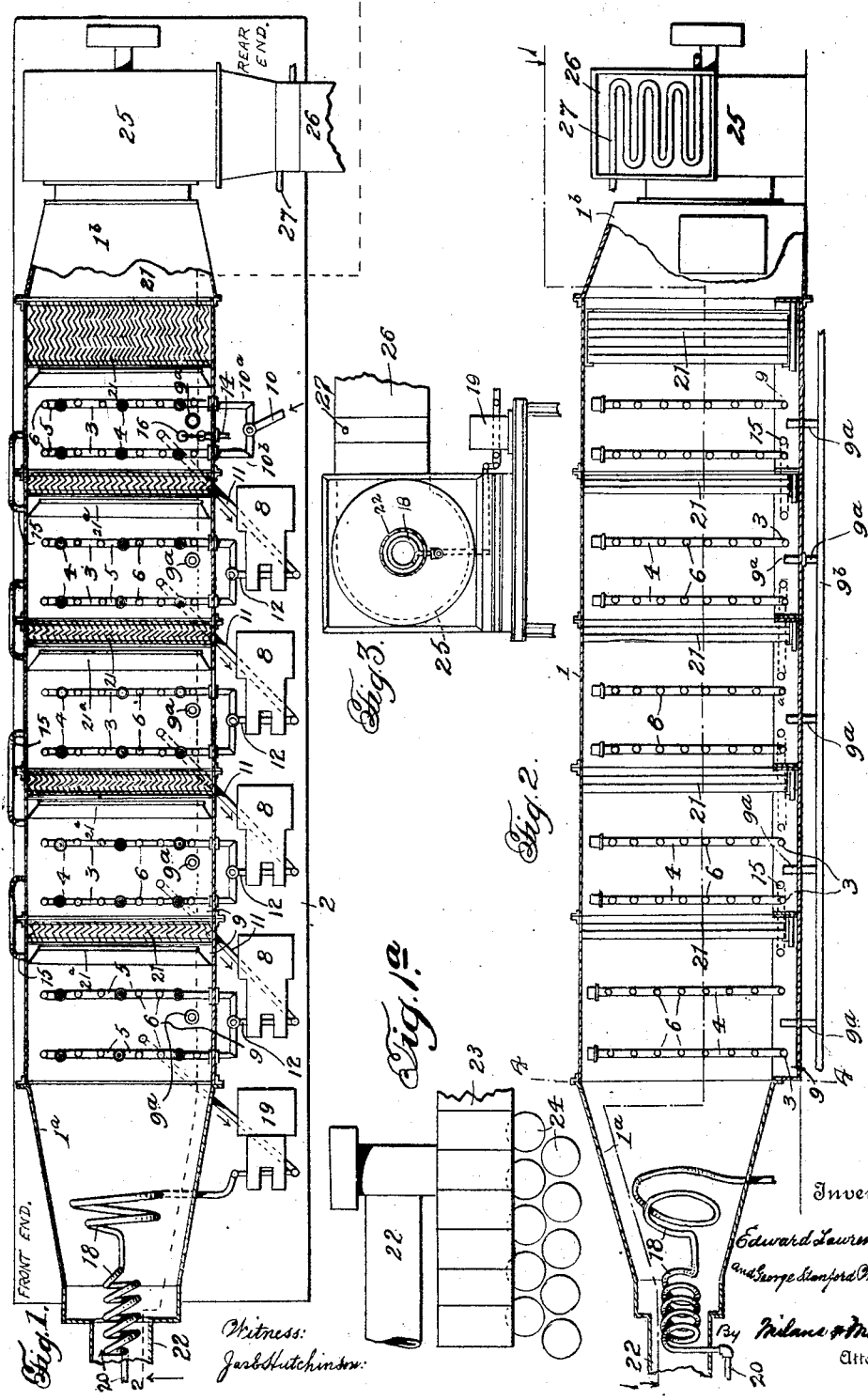

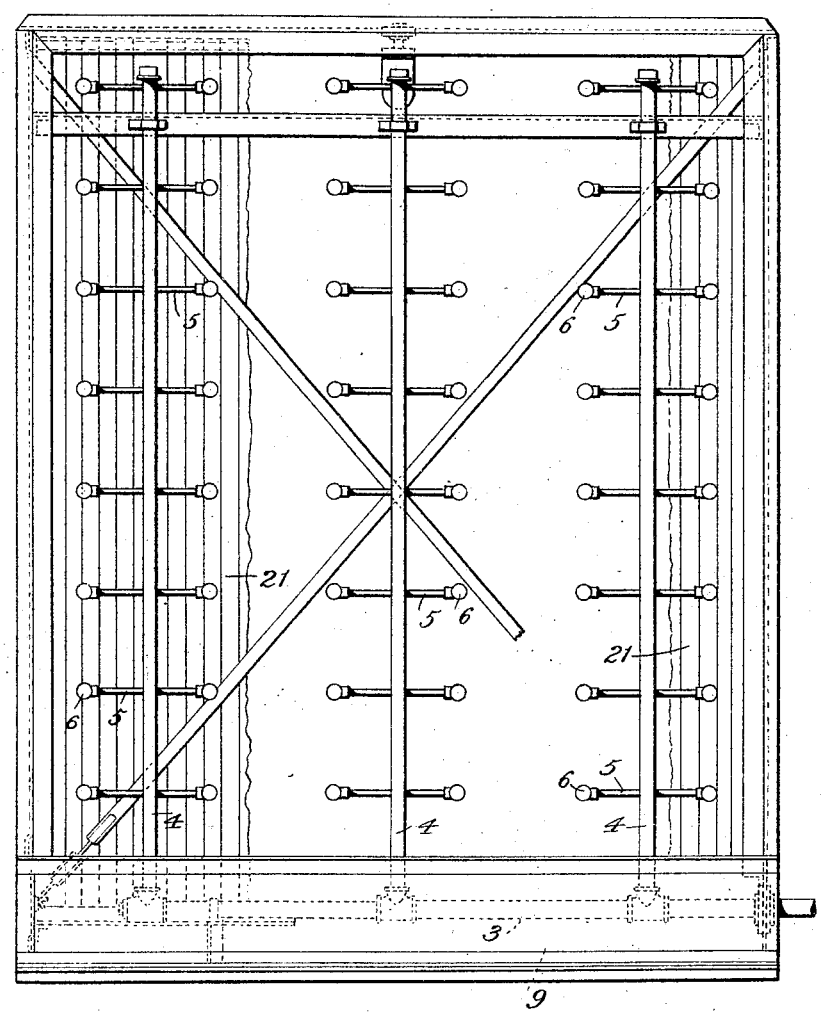

June 15, 1926.  
E. L. HOGAN ET AL  
1,588,833  
APPARATUS FOR RECOVERING HEAT FROM VAPOR, GASES, AND THE LIKE  
Filed Nov. 3, 1922  
3 Sheets-Sheet 3
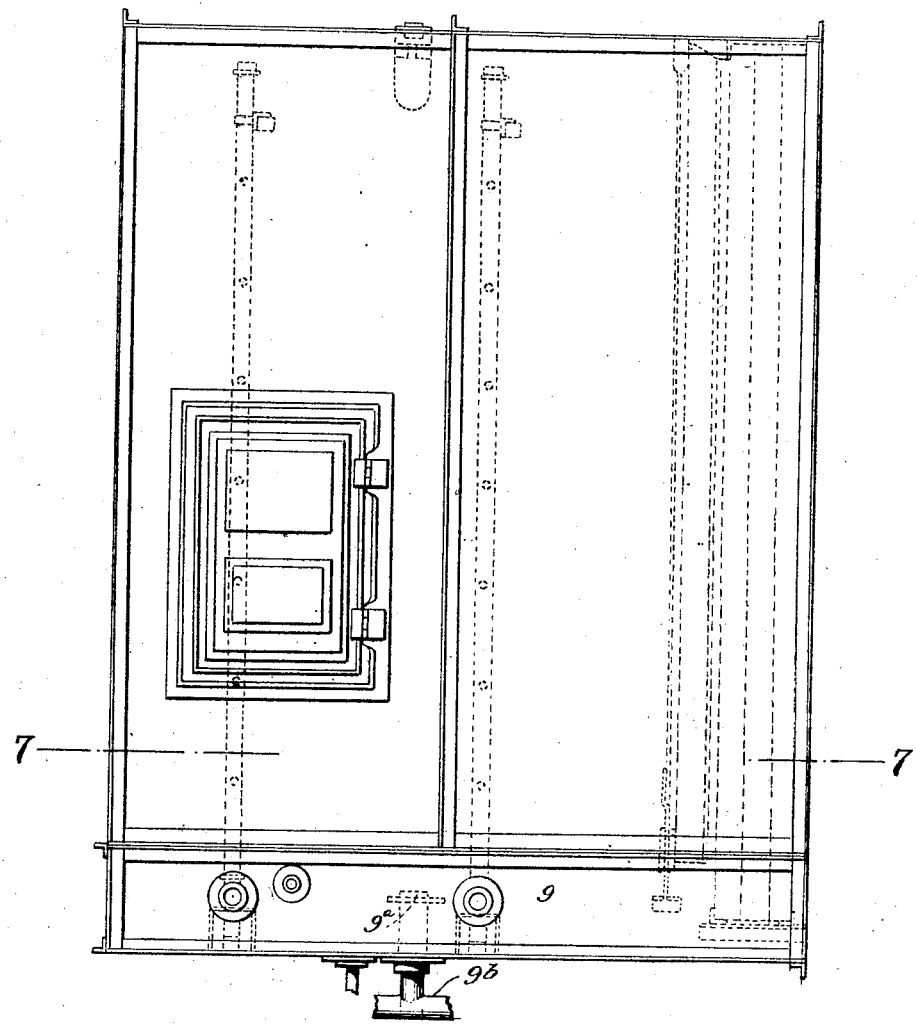
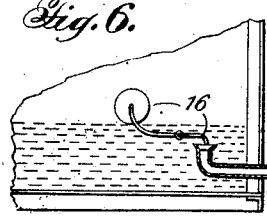

Patented June 15, 1926.

1,588,833

UNITED STATES PATENT OFFICE.

EDWARD LAWRENCE HOGAN, OF DETROIT, MICHIGAN, AND GEORGE STANFORD WITHAM, JR., OF HUDSON FALLS, NEW YORK, ASSIGNORS TO AMERICAN BLOWER COMPANY, OF DETROIT, MICHIGAN, A CORPORATION OF MICHIGAN.

APPARATUS FOR RECOVERING HEAT FROM VAPOR, GASES, AND THE LIKE.

Application filed November 3, 1922. Serial No. 598,875.

This invention relates to an improved apparatus for recovering heat, water and chemicals from waste air, gases, and liberated vapors from driers, vats, blow pits, brick kilns, or any process wherein moisture laden, chemical laden, or dust laden vapors are being liberated, or lost, to the atmosphere, the same being applicable to various kinds of apparatus, or plants such as salt grainers, dye houses, canning factories, paper mills, laundries, clay products plants, boiler or power plants or other places where considerable heat, moisture, or chemicals prevail in the air and ordinarily are liberated to the atmosphere.

It has heretofore been proposed to recover some of the heat of the hot air and vapors given off from drying equipment and the like by mixing a part of the waste or exhaust air and vapors with a sufficient amount of fresh or atmospheric air, thus producing a saturated condition of the air, and employing means for removing any excess moisture in the air prior to its being reheated and delivered to dry the wet web of paper, in the case of paper driers, but such practice only results in the recovery of less than one half of the heat in the waste air and vapors, depending upon the temperature of the fresh air. For instance, when the outside fresh air taken in has a temperature of from 30 to 40 below zero in the extreme northern localities, there is a possibility of saving approximately one half of the heat in the waste air and vapors, but as the outside temperature rises, or as the location of the plant becomes more southerly when the temperature of the outside air reaches approximately 60 degrees, there would be no saving and entirely fresh air would have to be used.

The object of the present invention is to provide an improved apparatus whereby a relatively large part of the heat of the hot air and vapors is recovered and utilized and also whereby it is possible to recover any chemicals or other by-products that have been vaporized in the manufacturing processes, which may be absorbed or condensed, resulting in a considerable saving in fuel and reduction in the cost of operation of the plant.

A considerable amount of hot, or warm water is required around manufacturing plants, especially paper mills, textile mills, laundries, etc., and the present invention contemplates recovering a large amount of heat from the exhaust air and vapors from manufacturing processes by circulating the hot waste air and vapors through a water heating and absorbing device, and utilizing the hot water so absorbed for various purposes in manufacturing, or for use in the heating of buildings, etc.

In accordance with our invention, the vapors, hot air and vapor, gases, and the like from the driers, vats, grainers, ironers, or other apparatus, is passed through a chamber or conduit, and water or other liquid is circulated relatively to the vapor stream to effect a thorough transference of the heat of the hot vapors to the liquid. More particularly the invention contemplates the injecting or discharging of water in the form of fine sprays into, or in the path of the stream of hot vapors, and in successive stages progressively at different points along the vapor stream in a direction counter to the direction of flow of the vapors through the chamber or conduit. By the use of an apparatus comprising a number of units each including water spraying means and a tank to catch the water therefrom, with means for recirculating the water successively through the spray means of the several units progressively providing for a counter flow or circulation of the water and vapor, the colder water, or other liquid is brought in contact with the cooler air or vapors. As the treatment proceeds, the warmer water is brought into contact with the warmer air or vapors, and ultimately the warm water or liquid is subjected to the relatively warm air or vapors, this particular system of treatment of the water progressively in successive stages at different temperatures involving the counter flow of the water and vapors providing for the extraction of the maximum amount of heat from the waste vapors by contact of the water with the vapor. The breaking up of the water or liquid in fine sprays provides a large amount of surface of contact of the water with the waste air and vapors. The heat transference may be and preferably is augmented by subjecting the vapor in its passage through the heating chamber to the action of baffle plates, a series of baffle plates being preferably associated with each of the several units of the apparatus, said baffle plates functioning to separate or extract the water from the waste vapors to prevent the mixing of the water in various units and interference with the progressive temperature stages of treatment.

The invention also contemplates the use of a closed heater or series of tubular heaters in conjunction with the water spray treatment in order to further increase the temperature of the water by utilizing the sensible heat or superheat in the waste air and vapor. The closed heater or series of closed heaters may be employed anywhere in the system either prior to or after the water spray treatment or at any intermediate point, but preferably, the water, or other liquid is passed through the series of closed or tubular heaters after the successive stages of treatment through the medium of the sprays. The water is finely delivered to a storage system, or used immediately, as desired, for various purposes. In those cases where chemicals are absorbed from the waste air and vapors, the water after its passage through the heating chamber may be treated to recover these by-products. The air after passing through the treating chamber and being subjected to the water sprays and baffles, relieved of its water vapor, or other vapors, and waste heat is reheated by any suitable means and employed over again within the plant for heating or drying purposes, thus eliminating the necessity of the introduction of fresh and relatively cold air from the outside for this purpose to take the place of the air which would ordinarily be exhausted from the building.

The invention, with other objects and advantages thereof, will be understood from the hereinafter contained detail description, when considered in connection with the accompanying drawings, forming part hereof, and illustrating one embodiment of an apparatus for practicing the method.

In the drawings:

Figure 1 is a horizontal section, taken on the line 1—1 of Figure 2, with parts shown in plan, of an apparatus constructed in accordance with the present invention.

Fig. 1ª is a side elevation of a part of the rolls of a paper drier and a portion of the hood and conduit for conducting the vapor from the rolls.

Fig. 2 is a vertical section taken on the line 2—2 of Figure 1, looking in the direction of the arrows.

Fig. 3 is a front end elevation of the construction illustrated Figure 1.

Fig. 4 is a vertical section, on an enlarged scale, on the line 4—4 Figure 2.

Fig. 5 is a side elevation, on an enlarged scale, of the forward section or unit of the treating chamber or conduit.

Fig. 6 is a detail view of the float valve of the rearmost section of the treating chamber.

Referring to a detail description of the particular form of apparatus illustrated in the drawings, 1 designates the chamber or conduit, the same being here shown as rectangular shape in cross section with tapering inlet and outlet end portions 1ª, 1ᵇ, and mounted to extend horizontally upon any suitable form of support. The chamber or conduit 1 is provided with a plurality of spray devices located at intervals along the same, and means is provided for circulating water through the spray devices in successive stages, progressively, starting from the outlet end portion of the chamber or conduit. Any suitable form of spray device may be employed, the particular construction shown comprising a main pipe section 3 extending horizontally across the lower chamber or conduit through one side wall thereof, and provided with vertical branch pipes 4, having a multiplicity of relatively short lateral extensions 5, which are provided with nozzles 6.

The water circulating means includes a system of pumps 8, and a series of tanks 9 located along the bottom of the chamber or conduit to receive the water from the spray devices, the spray devices being shown arranged in sets of two, a tank 9 being provided to receive the water from each set of sprays. 10 designates a water supply pipe having branches 10ª—10ᵇ leading to the first set of spray devices in the rear end of the chamber. A pipe 11 connects the rearmost tank 9 with a pump 8, which is shown located along side the chamber. The said pump discharges through a pipe 12 and a set of the spray devices into the next tank and so on to the end of the series of tanks. Each of the tanks 9 is provided with a short overflow pipe 9ª, that is connected with a main drain pipe 9ᵇ, leading to any suitable point providing for the carrying away of any excess water and also for washing out the heaters and tanks. The rearmost tank 9 is provided with a fresh water inlet connection 14 whereby the tank may be filled, when the equipment is started. 15 designates equalizer connections between the tanks, and 16 is a float valve in one of the tanks for maintaining a constant water level throughout the series of tanks.

In conjunction with the spray devices, a series of closed or tubular heaters 18 is provided, the same, in the particular form of apparatus shown, being located within the influence of the vapor stream in the inlet end portion 1ᵃ of the chamber or conduit. 19 is a pump suitably connected for circulating the water from the first of the series of tanks to the inlet end of the series of tubular heaters, and 20 is a conduit leading from the outlet end of the series of tubular heaters to a suitable storage tank (not shown). The system of pumps 8, and the pump 19, which are shown mounted on the support 2 at one side of the chamber or conduit 1, may be of any suitable type and any suitable operating means therefor (not shown) may be employed.

Arranged at intervals along the chamber or conduit 1 between the sets of spray devices are series of baffles or eliminator plates 21 dividing the chamber into a series of compartments, a series of the baffle or eliminator plates 21, which may be of any suitable construction, being located at the rear end of each of the tanks 9, as shown. 21ᵃ are deflectors extending inwardly from the walls of the chamber at a rearward inclination, said deflectors acting to direct the vapor inwardly from the walls of the chamber and being arranged at intervals along the chamber directly in advance of each of the series of baffle or eliminator plates 21.

The chamber or conduit 1 may be conveniently constructed as shown of a plurality of sheet metal sections suitably secured together, each section constituting a unit of the apparatus comprising a set of spray devices, a tank and a series of eliminator plates, the several sections being substantially similar in construction.

Any suitable means may be provided for conducting the vapors from the drier, cooking vat, salt grainer, or other apparatus or plant and circulating the same through the treating chamber or conduit. In the particular exemplification of the invention illustrated in Figure 2 of the drawings, the inlet end portion 1ᵃ of the chamber or conduit is connected by a conduit 22 with a hood 23 arranged over the drying rolls 24 of a paper drying machine (see Figure 1ᵃ), and 25 is a fan connected with the outlet end portion 1ᵇ of the chamber, a conduit 26 being connected with the outlet of the fan to convey the air to any desired point.

Any appropriate means may be provided for the purpose of reheating the air after its passage through the heating chamber. A steam heating coil 27 is shown interposed in the conduit 26 for this purpose.

In the operation of the apparatus, the hot air and or vapor, gases, or the like from the drier, cooking vat, salt grainer, paper mill, or other apparatus or plant is circulated through the chamber or conduit 1 in the direction of the arrow. The water or other liquid introduced through the supply pipe 10 and circulated in succession through the sets of spray devices is discharged in fine sprays into or in the path of the hot vapor stream at different points along the same in a direction counter to the flow of the vapors through the conduit, the water, or other liquid, being subjected to progressive stages of temperature treatment, the cooler water being brought in contact with the cooler air or vapor, the warmer water with the warmer air or vapor, and ultimately the warm water being brought in contact with the relatively warm air or vapor. The breaking up of the water or liquid in fine sprays in the path of the vapor provides a large amount of surface contact of the water with the waste air and vapors, a thorough transference of the heat of the hot vapors to the water being effected. During the passage of the vapor through the conduit, the series of baffle plates serve to agitate or break up the same assisting in the complete commingling and contact of the water throughout the entire body of air, the series of baffles chiefly functioning however, to separate or extract the water from the waste vapors after each spraying treatment to prevent the mixing of the water in the various units and interference with the progressive temperature stages of treatment. After the successive stages of spray treatment, the temperature of the water is further increased by its passage through the series of closed heaters 18. The water is finally drawn off from the series of tubular heaters through the conduit 20 to a suitable storage tank, or may be used immediately, as desired, for various purposes. In instances, in which the vapors contain chemicals, the water or other liquid, is treated to recover these by-products. The air after its passage through the treating chamber relieved of its water vapor, waste heat, and chemicals, is reheated and used over again in the plant, the same being conducted to any desired point for this purpose. In this way is eliminated the necessity of the introduction of fresh and relatively cold air from the outside for this purpose to take the place of the air which would ordinarily be exhausted from the building, and the additional heat required incident thereto in the use of the colder air, a material saving in the cost of the operation of the plant being thus accomplished.

In practicing the invention, chemicals as well as water may be discharged in the path of the vapors. For instance, in the use of the invention in connection with blow pits of the Kraft or sulphite system, in order to reduce the acid effect, lime water may be discharged in the path of the vapors instead of pure water.

The heated water obtained by our improved method hereinbefore set forth, may be employed for feeding boilers, washing purposes or for any of the many uses for which the same may be employed in connection with manufacturing operations generally, and also for heating building or other purposes, our improved method including the utilization of the heat from the vapors, and the utilization of the reheated air over again for drying purposes in the plant, resulting in a material reduction in the cost of fuel and the cost of equipment required, and representing a material saving in the cost of operating manufacturing plants.

It will be noted that the apparatus is of a compact nature and may be arranged on the floor level with the machines, or can be advantageously installed in a basement, or a floor below the vats, grainers, driers or other apparatus.

While a particular embodiment of the invention, which has proven satisfactory in practice, is illustrated in the drawings, it will of course be understood that the particular construction shown may be changed and modified, and the invention embodied in other forms, as will appeal to those skilled in the art and falling within the scope of the appended claims, without departing from the spirit of the invention. Various forms of spray devices may be employed. The size of the treating chamber or conduit and number of sprays and tanks may vary to meet different manufacturing conditions. It will be understood that the invention has an extensive field of usefulness in the treatment of waste air and or vapor, gases, and the like, generally with any process and in connection with various kinds of apparatus wherein moisture laden, chemical laden or dust laden vapors are being liberated or lost, and that in the claims the terms vapor, gas, or the like are intended and are to be interpreted broadly to comprehend air and or vapor, exhaust fumes, gases and vapors generally.

What we claim is:

1. An apparatus of the class described, including a chamber, means for circulating vapor, gas, or the like through said chamber, means for circulating and discharging water in a spray into the chamber in the path of the vapor, gas, or the like, in separate successive stages progressively at different points along the same in a counter direction to that of the travel of the vapor, gas, or the like through the chamber, said means including a series of spray devices located at intervals along the chamber, a series of tanks disposed along the chamber, each one of the tanks being associated with one of the series of spray devices to receive the water therefrom, a water supply connection for one of the series of spray devices, means for circulating the water from certain of the tanks to the other spray devices in series, and means within the chamber located at intervals along the same between the spray devices to separate water from the vapor, gas, or the like and prevent interference between the different temperature stages of treatment of the water.

2. An apparatus of the class described including a chamber, means for circulating vapor, gas, or the like through said chamber, means for circulating and discharging water in a spray into the chamber in the path of the vapor, gas, or the like in separate successive stages at different points along the same in a counter direction to that of the travel of the vapor, gas, or the like through the chamber, said means including a series of spray devices located at intervals along the chamber, a series of tanks along the chamber, each of the tanks being associated with one of the series of spray devices to receive the water therefrom, a water supply connection for one of the series of spray devices, and means for circulating water from certain of the tanks to the other spray devices in series.

3. An apparatus of the class described, including a chamber, means for circulating vapor, gas, or the like through said chamber, means for circulating and discharging water in a spray into the chamber in the path of the vapor, gas or the like in separate successive stages progressively at different points along the same in a counter direction to that of the travel of the vapor, gas, or the like through the chamber, said means including a series of spray devices located at intervals along the chamber, a series of tanks disposed along the chamber, each one of the tanks being associated with one of the series of spray devices to receive the water therefrom, a water supply connection for one of the series of spray devices, means for circulating the water from certain of the tanks to the other spray devices in series, and series of eliminator plates located at intervals along the chamber at one end of the tanks between the spray devices to separate water from the vapor, gas, or the like and prevent interference between the different temperature stages of treatment of the water.

4. An apparatus of the class described, including a horizontally extending conduit, means for circulating vapor, gas, or the like through said conduit, means for circulating and discharging water in a spray into the conduit in the path of the vapor, gas, or the like in separate successive stages progressively at different points along the same in a counter direction to that of the travel of the vapor, gas, or the like through the conduit, said means including a series of spray devices located at intervals along the conduit, a series of tanks disposed along the bottom of the conduit, each one of the tanks being associated with one of the series of spray devices to receive the water therefrom, a water supply connection for one of the series of spray devices, and means for circulating water from certain of the tanks to the other spray devices in series.

5. An apparatus of the class described, including a horizontally extending conduit, means for circulating vapor, gas, or the like through said conduit, means for circulating and discharging water in a spray into the conduit in the path of the vapor, gas or the like in separate successive stages progressively at different points along the same in a counter direction to that of the travel of the vapor, gas, or the like through the conduit, said means including a series of spray devices located at intervals along the conduit, a series of tanks disposed along the bottom of the conduit, each one of the tanks being associated with one of the series of spray devices to receive the water therefrom, a water supply connection for one of the series of spray devices, means for circulating water from certain of the tanks to the other spray devices in series, and series of eliminator plates extending transversely of the conduit and located at intervals along the same between the spray devices to separate water from the vapor, gas, or the like and prevent interference between the different temperature stages of treatment of the water.

6. An apparatus of the class described including a chamber, means for circulating vapor, gas, or the like through said chamber, means for circulating and discharging water in a spray into the chamber in the path of the vapor, gas, or the like in separate successive stages progressively at different points along the same in a counter direction to that of the travel of the vapor, gas, or the like through the chamber, said means including series of eliminator plates located at intervals along the chamber and dividing the same into a series of compartments, spray devices located at intervals along the chamber between the series of eliminator plates, and separate tanks along the chamber for receiving the water from the respective spray devices, said series of eliminator plates acting to separate water from the vapor, gas, or the like and prevent interference between the different temperature stages of treatment of the water.

In testimony whereof we hereunto affix our signatures.

EDWARD LAWRENCE HOGAN.
GEORGE STANFORD WITHAM, Jr.